Nov. 12, 1963     W. S. GILES     3,110,298
VALVE STEM OIL SEAL
Filed Aug. 30, 1961     2 Sheets-Sheet 1
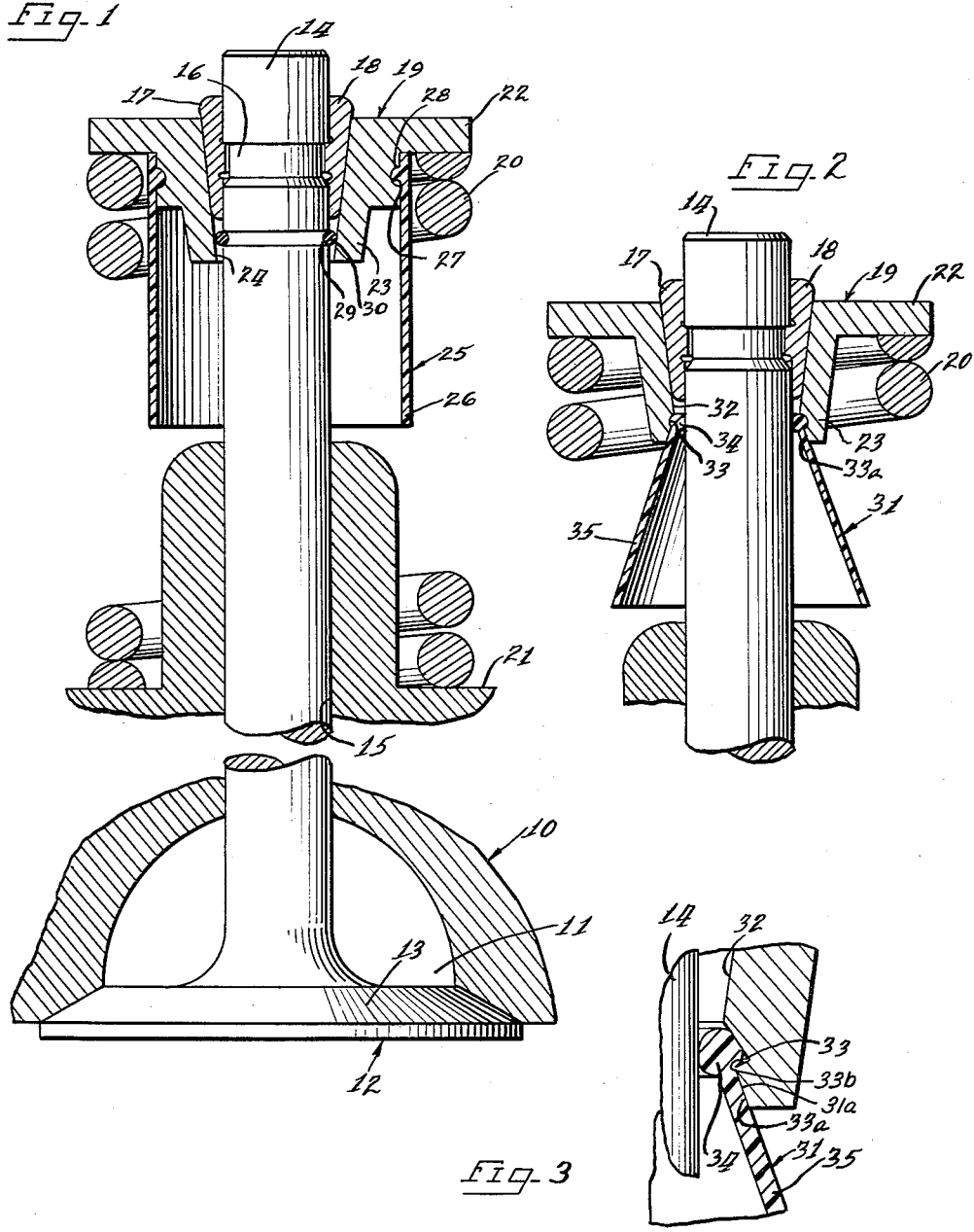
INVENTOR.
William S. Giles
BY
ATTORNEYS Nov. 12, 1963  W. S. GILES  3,110,298
VALVE STEM OIL SEAL
Filed Aug. 30, 1961  2 Sheets-Sheet 2
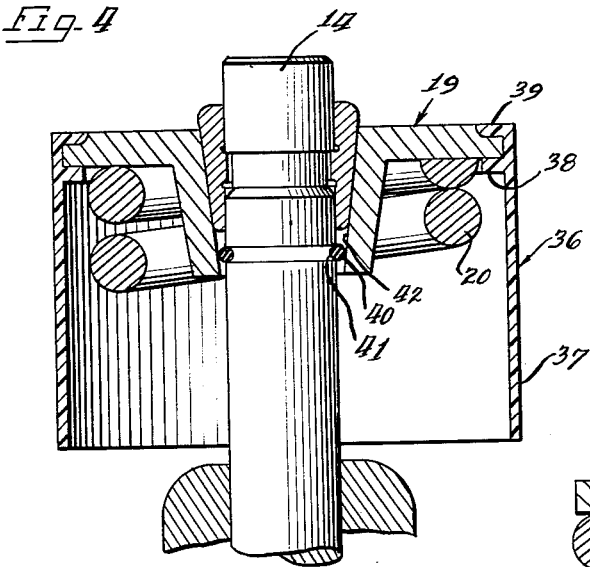
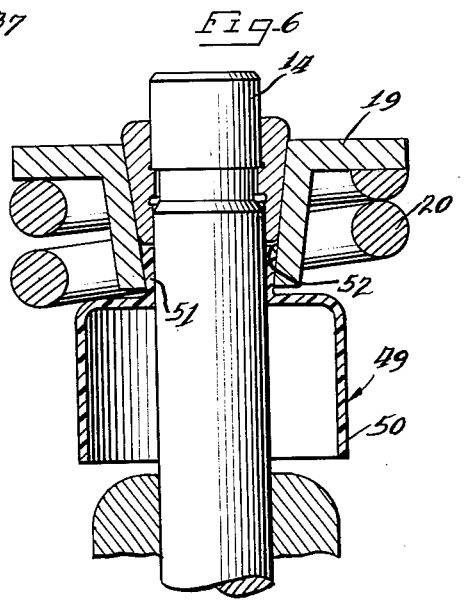
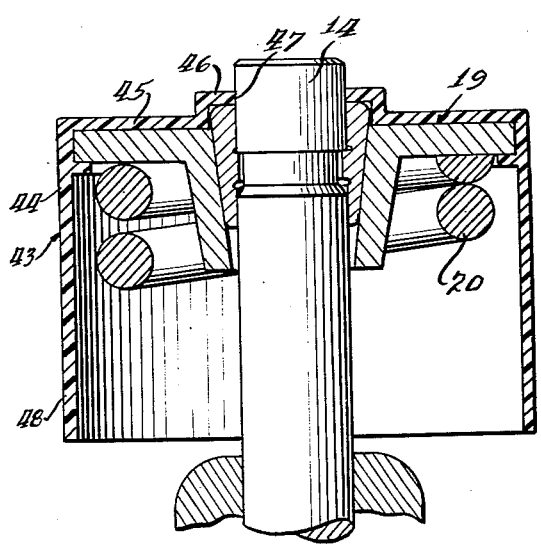
INVENTOR.
William S. Giles
BY
ATTORNEYS

United States Patent Office 3,110,298
Patented Nov. 12, 1963

3,110,298
VALVE STEM OIL SEAL
William S. Giles, Highland Heights, Ohio, assignor to Thompson Ramo Wooldridge Inc., Cleveland, Ohio, a corporation of Ohio
Filed Aug. 30, 1961, Ser. No. 135,005
7 Claims. (Cl. 123—188)

The present invention relates to an improved assembly for attachment to a valve stem, and particularly to a shield and seal mechanism which prevents an excess of lubricating oil from flowing into the combusion chamber of the engine along the valve stem, by sealing the valve stem between the cap and stem and by providing a spray shield.

Lubricating oil flows into the combusion chamber of an internal combustion engine through the clearance that exists between the valve stem and the guide. A certain minimum volume of lubricant is required for lubricating purposes, but the total amount required is small and this presents a difficult metering problem in order to avoid excess oil loss, and to avoid the other problems which present themselves due to excessive oil flowing down the valve stem.

An object of the present invention is to provide an improved seal and shield which is supported on the valve spring cap and which prevents unwanted oil from reaching the valve stem.

Another object of the invention is to provide a valve stem attachment having a part which provides a seal between the stem and cap and which also functions to support an oil spray shield.

A further object of the invention is to provide an improved material for the construction of an oil seal and shield carried on a valve spring cap, which is well suited for use in a dynamic system, is resistant to oil and the temperatures encountered, is relatively inexpensive to manufacture and assemble, and provides improvements over devices heretofore available.

A further object of the invention is to provide an improved valve spring cap assembly wherein a shield element is employed which serves a dual purpose of preventing oil spray and splash from contacting the stem below the cap area and which seals the stem against the flow of oil from above the valve cap along the stem.

Another object of the invention is to provide an adequate valve stem seal which avoids problems created in cylinder head assembly because of the use of extra parts with seals of the type heretofore available, by the provision of a one-piece cap and oil control seal that can be assembled directly with the cylinder head assembly.

A feature of the present invention is the provision of a seal and shield structure for attachment to a valve stem with a valve spring cap having either no modification or minor modification of the cap and stem, including a seal between the cap and stem and an annular oil deflecting shield supported on said cap, preferably formed of one-piece and of an acetal resin polymer thermoplastic, projecting axially below the cap. In one arrangement the invention features the seal as performing a dual function as a support for the shield and as a seal. In modified arrangements the seal and shield are formed in separate parts.

Other objects, features and advantages will become more fully apparent with the teaching of the principles of the invention in connection with the disclosure of the preferred embodiments thereof in the specification, claims and drawings, in which:

FIGURE 1 is a vertical sectional view taken through the head of an engine and illustrating a valve assembly employing a valve cap arrangement embodying the principles of the present invention;

FIGURE 2 is a fragmentary vertical sectional view taken through the upper end of a valve assembly illustrating a form of the invention where the seal and shield are formed in one piece;

FIGURE 3 is an enlarged fragmentary sectional view showing a portion of FIGURE 2;

FIGURE 4 is a fragmentary sectional view of a valve cap assembly showing a modified form of the invention;

FIGURE 5 is a fragmentary vertical sectional view of a valve cap assembly illustrating a further form of the invention; and FIGURE 6 is a fragmentary sectional view of a valve cap assembly showing an important form of the invention where the seal and shield are formed in one piece.

As shown on the drawings:

The invention embodies a unit which serves the dual function of a stem seal and a spray shield, and the arrangements of FIGURES 2 and 6 illustrate the structure formed in a single unitary piece. The unit 49, which is illustrated in FIGURE 6, requires a minimum of modification to the spring cap and embodies a very simple design, and the arrangement of FIGURES 2 and 3 provides a modified form of the basic arrangement of FIGURE 6. The structures of FIGURES 1, 4 and 5 show modified forms with FIGURES 1 and 4 showing the structure formed in two parts. For convenience of description the structures will be described in the order of the figure numbers.

FIGURE 1 illustrates a valve assembly for an internal combustion engine with the view showing portions of an engine head 10 in section, with a valve port 11 therein closed by a poppet valve 12. The valve has the usual head 13 mounted on a valve stem 14, and the stem is slidably mounted in a guide bore 15 in the head. Lubricating oil coming into contact with the stem 15 will flow down along the stem through the guide bore 15 and will be lost. This is objectionable from the standpoint of losing lubricating oil and from the standpoint of the oil burning with the combustion gases of the engine to cause smoking and cause carbon to build up in the combustion chamber. It is desirable therefore to maintain the oil on the stem at a minimum quantity necessary for lubrication and in accordance with the present invention, an oil shield and seal is provided therefor.

At the upper end of the stem 14 an annular valve lock receiving groove 16 is provided, and valve locks 17 and 18 have inwardly extending ridges which are received by the groove to hold them in place. The locks 17 and 18 hold a valve spring cap 19 on the stem and the cap receives the upper end of a coil compression valve spring 20 which seats at its lower end on a shoulder 21 on the head.

The valve spring cap has a radially outwardly extending flange portion 22 which receives the valve spring, and has an annular shank 23 with an axial bore 24 therethrough. The bore 24 is tapered outwardly in an upward direction so as to engage the tapered outer surfaces of the locks 17 and 18 for holding the cap 19 in place on the valve stem in a well known manner. It will be understood that the cap may be of various suitable constructions known to the art and minor modifications in shape or size will not materially affect its relationship with the oil seal and shield, as will be described.

The oil seal and shield is shown formed in two parts in the arrangements of FIGURES 1 and 4, and a one-piece arrangement is shown in FIGURES 2, 3, 5 and 6.

An annular lubricating oil shield 25 is shown in FIGURE 1 supported solely on the cap 19. The shield has an annular skirt portion 26 which extends axially downwardly to prevent oil spray and splash from reaching the valve stem 14. The shield 25 is supported on the cap by a radially inwardly extending annular bead on the upper inner surface of the skirt 26 projecting into an annular groove 28 on a shoulder on the shank 23 of the cap.

Oil is prevented from passing between the locks 17 and 18 and down between the cap and stem by an O-ring seal 30 which rests in an annular groove 29 formed in the outer surface of the valve stem and engages the surface of the bore 24 of the cap.

In the arrangement of FIGURES 2 and 3, an oil shield 31 is supported also between the valve spring and the valve stem 14, but the shield 31 performs a dual function in shielding the stem from splash and splatter of oil and in sealing the stem from the flow of oil between the cap and stem.

The cap 19 is provided on the inner surface of the bore 32 with an annular groove or recess 33 which receives an annular bulbular bead 34 at the upper end of the skirt 35 of the shield. This bead is locked in the groove 33 for supporting the shield 31 and for providing an effective seal against the inner surface of the bore 32. The bead 34 also engages the outer surface of the valve stem 14 with an interference fit so as to prevent oil from flowing down along the stem. The lower end of the bore 32 is flared slightly outwardly at 33a, FIGS. 2 and 3, so that the parts can be easily assembled by forcibly snapping the bead 34 into the groove 33. The groove 33 may have tapered annular surfaces. The groove 33 provides a first annular tapered surface 33a, FIGURE 3, facing inwardly toward the bore of the cap and facing axially upwardly. The bead 34, by a lower outwardly facing first surface portion thereof, is in engagement with the surface 33b. The cap, at 33a provides a second annular surface which faces generally axially downwardly. The shield 31, has an outer portion directly below the bead 34, providing a second surface at 31a, which faces generally axially upwardly and is in engagement with the second surface 33a of the cap. This causes the annular seal to clamp itself firmly to the cap so that it will be supported on the cap and positioned accurately axially relative to the cap and the cap will in turn be supported and positioned on the stem.

The shield 31, in the arrangement shown in FIGURE 2, as well as the arrangements of the other figures, is formed of a plastic material. This provides a shield which can be made of sufficient thickness to obtain rigidity to project axially downwardly from the cap and yet of sufficient resiliency so that the same material of the one-piece shield can be used as a seal which is captured between the two opposing surfaces and which resiliently forces itself against the surfaces for an effective sealing relationship.

A preferred plastic structure for the shields is an acetal resin polymer of a thermoplastic. A polyoxymethylene is used in the preferred example having a tensile strength of 10,000 p.s.i. at room temperature with no true yield point. The material has a flexural modulus of 410,000 p.s.i. and is very slightly affected in strength by moisture. The polymer has a high strength retention at elevated temperatures, and is therefore well suited to use in engine conditions. For example, at 200° F. the polymer has a tensile strength of 6,000 p.s.i., and a flexural modulus of 180,000 p.s.i. The thermoplastic is a high-melting, highly crystallin type of acetal resin polymer, and a thermoplastic such as the type sold under the trade name Delrin is an example of the type above disclosed. It will be understood that thermosetting plastics and elastomers may be used for the seal and shield.

The material is light in weight having substantially ⅙ the weight of metal and therefore is well suited for use in a dynamic structure. The stress at the points of connection between the shield and the cap will be substantially reduced as compared with a similar structure formed of metal, for example, wherein the heavier weight must be accommodated.

In the arrangement of FIGURE 4, a lubricant shield 36 is mounted on the cap 19 and has a lower axially extending skirt portion 37. The shield is fixed to the cap by being either molded thereto or press assembled thereto and for this purpose the shield has inwardly projecting spaced flanges 38 and 39 forming a groove therebetween for receiving the outer peripheral edge of the cap.

A seal in the form of an O-ring 40 is provided between the stem 14 and the cap 19, being seated in a groove 41 and sealingly engaging the surface of the bore 42 within the cap.

As shown in FIGURE 5, an oil deflection shield 43 is mounted on the cap 19 and is provided with a groove for slipping over the annular peripheral edge of the cap with an inwardly extending flange 44 forming the lower portion of the groove, and the shield extending upwardly over the top of the cap at 45 to form the upper portion of the groove. The shield extends inwardly and turns upwardly at 46 around the valve stem with a central opening 47 to provide an interference fit over the valve stem. Thus the one-piece shield seals against the valve stem above the cap preventing leakage downwardly along the stem. The shield is also provided with a downwardly axially extending skirt 48 which prevents oil splash and spray from reaching the stem 14.

In the basic arrangement shown in FIGURE 6, a one-piece shield and seal unit 49 is provided which has an axially extending skirt portion 50 that is positioned inside of the valve spring 20, to function as a spray shield. The skirt portion turns inwardly at its upper end to integrally join the end sealing portion 51, which serves a dual function as a seal and a support.

The sealing portion 51 has in inner cylindrical surface encircling the outer surface of the stem and sealing the stem to prevent oil from passing downwardly along the stem surface. The outer surface of the sealing portion 51 is tapered to conform to the bore 52 of the cap. The maximum diameter of the sealing portion 51 is slightly larger than the inside diameter of the bore 52 which results in a snap fit. In this manner the combination can be installed as a unit during cylinder head assembly.

As will be observed from the structure illustrated, the one-piece unitary member 49 is susceptible of easy and inexpensive manufacture, and provides a compact lightweight relatively simple unit for attachment to structures of existing designs. If adequate clearance is available between the bore 52 of the valve cap, and the valve stem 14, no modification need be made to the cap and stem structure. The sealing portion 51 is firmly held in place to provide a reliable support for the skirt or spray shield 50, and to provide an effective reliable seal between the stem and the cap. The arrangement of FIGURES 2 and 3 is essentially a modified form of FIGURE 6, requiring an additional groove for holding the annular bead at the upper end of the shield.

If the construction of the seal and shield unit is such that insufficient oil reaches the stem for the minimum lubrication requirements, a small hole can be located in the seal area which will act as a metering orifice. In normal operation, however, this would not be required. The combined spring cap and oil seal and shield assembly functions as a valve stem seal by the use of a slight interference fit between the stem or the bore of the cap and thermoplastic material and in this manner, oil cannot pass down the valve stem from the overflow of the valve tip lubrication supply. As no relative motion occurs between the plastic and the valve stem or bore surface, no wear will occur which will destroy the slight interference fit. The remainder of the plastic shield acts as a wall which prevents oil spray and splash from contacting the stem below the seal area.

It operation each of the shields shown in the drawings extends generally in an axial direction downwardly from the cap 19 to prevent oil splash and spray from reaching the valve stem 14, and an integral portion of the one-piece shield (a separate seal is used in the arrangements of FIGURES 1 and 4) provides a seal, preventing oil from leaking along the stem between the stem and the bore of the cap.

The physical properties of the plastic shield are critical in that the material must be of a strength to retain its shape when operating in an environment of hot engine oil, high operating temperature, and in the environment of the contaminates that will be found in lubricating oil. Several thermoplastic materials may be used but the type above described exhibits the best resistance to contaminants and possesses other features well suited for the combination described.

The plastic shields can be made by various manufacturing techniques such as injection molding, although other forms of fabricating or machining may be employed. The different designs of shields disclosed provide structures for accommodating different forms of caps such as those for example made of pressed steel or made in other forms. The shields are not expensive to manufacture, do not require high tolerances, and are relatively easy to assemble during assembly of the engine head.

Thus it will be seen that I have provided an improved valve cap assembly which meets the objectives and advantages above set forth and which is well adapted for use on existing engines or engines of new designs.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a valve cap and stem assembly, a valve having a head and a stem, an oil seal and shield having an annular light-weight relatively thin shield portion spaced from the stem of the valve and extending axially in a direction toward the head of the valve for deflectingly preventing oil from reaching the valve stem, and having an integral seal portion held between said cap and stem and providing a seal therebetween and supporting said shield portion, said seal portion having an inner diameter substantially equal to the diameter of the valve stem.

2. A shield and seal structure for a valve stem having a spring cap comprising an annular light-weight relatively thin spray shield element spaced from the stem of the valve and projecting axially along the valve stem, and a seal element attached to said shield element adapted to be positioned between the cap and valve stem for sealing them stem and preventing oil flow between the stem and cap, said seal element supporting said shield element on said stem.

3. A shield and seal structure for a valve stem having a spring cap with a tapered inner bore comprising an annular light-weight relative thin spray shield element for projecting axially along the valve stem, and being spaced from the stem of the valve, and a seal element attached to said shield element adapted to be positioned between the cap and valve stem for sealing the stem and preventing oil flow between the stem and cap, said seal element having an inner surface for an interference fit with the stem and a tapered outer surface for engaging the inner surface of the bore of the cap, said seal element providing the sole support for said shield element on said stem.

4. A shield and seal structure for a valve stem having a spring cap in accordance with claim 2, wherein the spring cap has an annular shank with a bore therethrough and an annular groove on the inner surface of the shank positioned to face the stem in said bore, wherein said seal element is in the form of an annular bead positioned to be lockingly received in said groove for supporting the shield.

5. A valve cap assembly for attachment to a valve stem comprising a valve spring cap having an annular shank with a bore therethrough and a spring engaging radial flange, an annular light-weight relatively thin shield supported on said shank and extending axially therefrom being spaced from the stem of the valve for deflectingly preventing lubricant from engaging a valve stem in said bore, and a projecting portion at one end of the shield extending into the end of the shank for being supportingly held between the inner surface of the shank and the outer surface of the valve stem in said bore, the inner diameter of said portion being substantially equal to the diameter of the valve stem.

6. A shield and seal structure in accordance with claim 4 wherein said annular bead is of resilient material and is at an end of the shield and has an outer diameter to be lockingly received in said groove and an inner diameter to yieldingly and sealingly engage the outer cylindrical surface of the valve stem in the bore.

7. A valve cap assembly for attachment to the annularly lock-grooved end of a valve stem comprising a valve spring cap having an annular shank with a bore therethrough tapered upwardly to an enlarging opening and having a spring engaging radial flange, an annular light-weight relatively thin shield spaced from the stem of the valve and extending axially for deflectingly preventing lubricant from engaging a valve stem in said bore, and a resilient supporting projection on said shield extending upwardly into the bore for being sealingly wedged outwardly against the bore by the cylindrical valve stem in the bore for sealing the stem and supporting the shield, the inner diameter of said projection being substantially the same as said valve stem.

References Cited in the file of this patent

UNITED STATES PATENTS

| | | |
|---|---|---|
| 2,698,012 | Smith et al. | Dec. 28, 1954 |
| 2,716,401 | Sietman | Aug. 30, 1955 |
| 2,822,796 | Niess | Feb. 11, 1958 |
| 2,855,915 | Norton | Oct. 14, 1958 |
| 2,876,759 | Duesenberg | Mar. 10, 1959 |